United States Patent Office 3,560,135
Patented Feb. 2, 1971

3,560,135
NOVEL CONCENTRATED SOLUTION OF
CATIONIC DYES
Wataru Yamaya and Sadao Fujino, Kitakyushu-shi, Japan, assignors to Mitsubishi Chemical Industries Limited, Tokyo, Japan
No Drawing. Filed May 17, 1967, Ser. No. 639,020
Claims priority, application Japan, May 24, 1966, 41/32,727
Int. Cl. D06p 1/20
U.S. Cl. 8—39                                    8 Claims

ABSTRACT OF THE DISCLOSURE

The dye solution comprises (1) at least one cationic dye, (2) phosphoric acid or an acidic phosphoric acid ester and (3) at least one water-soluble organic solvent. The solvent is a polyol of the formula:

HO·R(G·R')n·OH wherein R and R' denote an alkylene group having 2 to 3 carbon atoms or a 2-oxy-propyl group, $n$ denotes an integer which is zero to 2 and G denotes an oxygen atom. When $n$ is 1, G may also be a sulphur atom, a sulphonyl group or a >N·COH group; a lower alkyl ether of said polyol; dimethyl sulphoxide; or dimethyl formamide.

The invention relates to a novel concentrated solution of cationic dyes. More particularly, the invention relates to concentrated solutions of cationic dyes which are suitable for dyeing or printing fibrous materials, especially acrylic and modacrylic fibrous materials. The said solutions are also useful for preparing inks and other coloring materials.

In the prior art, cationic dyes have been used in the form of solid particles, crystals, or a powder composition in which as a component a suitable solid diluent or a suitable assistant is contained. Generally, these cationic dyes in the form of a powder composition are not completely soluble in water. The solubility of these conventional dyestuffs is only in the range of from 50 to 150 grams per liter even under the most favorable conditions. Further, it is difficult for some solid triarylmethane dyes to completely dissolve in water because of their tendency to solidify to the resinous form. Still further, powdered cationic dyes often absorb moisture and become a lump thereby reducing their solubility as well as their commercial value. Still further, when handled, cationic dyes in the form of fine powder readily scatter in air thereby contaminating other products and adversely affecting the health of workers.

Accordingly, this invention provides a concentrated and stable solution of cationic dyes which avoids the above-mentioned shortcomings so common with the solid cationic dyes of the prior art.

The concentrated solution of cationic dyes according to this invention consists of the following listed components, water and a surface active agent, if required:

(a) one kind or more of cationic dyes,
(b) phosphoric acid or acidic phosphoric acid ester, and
(c) one kind or more of water-soluble organic solvents selected from the class consisting of polyols of the following formula: HO·R(G·R')n·OH wherein R and R' denote an alkylene group having 2 or 3 carbon atoms or a 2-oxy-propyl group, $n$ denotes an integer which is 0, 1, or 2, and G denotes an oxygen atom, whereas $n$ is 1, G may be a sulphur atom, a sulphonyl group, or a >N·COH group; lower alkyl ethers of said polyols; dimethyl sulphoxide; and dimethyl formamide.

Cationic dyes applicable as a component of a cationic dye solution according to this invention include triarylmethane dyes, methine dyes, polymethine dyes, polyazamethine dyes, azine dyes, oxazine dyes, thiazine dyes, azo dyes, anthraquinone dyes, and triazene dyes which have at least one quaternary ammonium group in the molecule. Salts of such cationic dyes may also be utilized as a component of the cationic dye solution of the invention.

Preferred cationic dyes for use in preparing the cationic dye solution of this invention are the following:

(1) Triarylmethane dyes of the following formula:

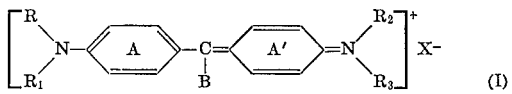

(I)

wherein R, $R_1$, $R_2$, and $R_3$ denote a hydrogen atom, or an alkyl group having 1 to 3 carbon atoms which may be substituted by a cyano group, an alkoxy group, a hydroxy group, halogen atom; A and A' denote a phenylene group which may have a methyl group or a methoxy group; B denotes an aryl group; and X denotes an anion. Examples of such triarylmethane dyes include:

C.I. Nos. 42000, 42025, 42030, 42037, 42500, 42520, 42555, 42595, 42600, 42705, and the dyes referred to in the examples mentioned in the later part of this specification.

(2) Polymethine dyes or azomethine dyes of the Formula II or III:

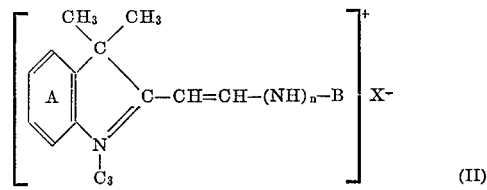

(II)

wherein A denotes a phenylene group which may have a methyl group or a methoxy group; B denotes an aryl group; $n$ denotes an integer which is zero or 1; and X denotes an anion.

Examples of such dyes include:
C.I. Nos. 48015, 48020, 48035, 48040, 48050, 48060, 48065 and the dyes referred to in the examples mentioned in the later part of this specification.

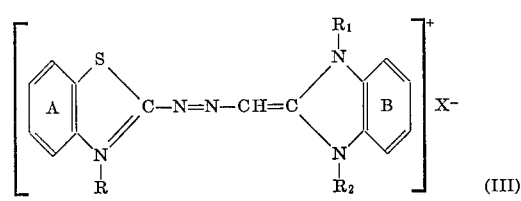

(III)

wherein R, $R_1$, and $R_2$ denote an alkyl group or an aralkyl group; A and B denote a phenylene group which may be substituted; and X denotes an anion.

Examples of said dyes include such dyes as referred to in U.S. Patent No. 2,872,449 and such dyes as referred to in British Patent Nos. 821,001, and 808,308.

(3) Oxazine dyes of the formula as follows:

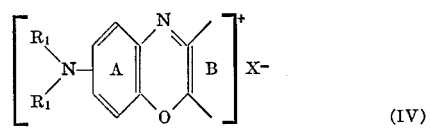

(IV)

wherein A denotes a phenylene group which may be substituted; B denotes an aromatic residue; R and $R_1$ denote a hydrogen atom, a methyl group, or an ethyl group; and X denotes an anion.

Examples of said dyes include:

C.I. Nos. 51000, 51004, 51005, 51010, 51175, 51185 and 51190, dyes referred to in U.S. Patents Nos. 2,528,862 and 2,528,863 and British Patents Nos. 891,233 and 812,227.

(4) Azo dyes of the formula as follows:

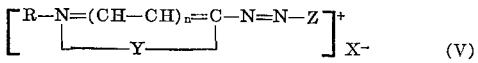

wherein R denotes a methyl group, an ethyl group, or a cyanoethyl group; Y denotes a group which supplements the nitrogen atom-containing ring to a hetero aromatic nucleus having 5 to 6 members; $n$ denotes an integer which is zero or 1; Z denotes an aromatic residue; and X denotes an anion.

Examples of said dyes include such dyes as referred to in U.S. Pats. Nos. 3,101,988, 3,132,133, and 3,280,100, British Pats. Nos. 789,263, 837,472, and 972,956, Japanese Pats. Nos. 284,053, 415,220, and Japanese patent publication No. 14,934 of 1962.

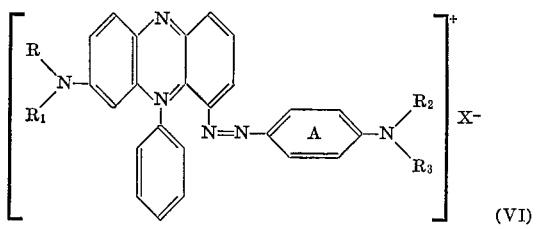

wherein R, $R_1$, $R_2$, and $R_3$ denote a hydrogen atom, a methyl group, or an ethyl group, whereas $R_2$ and $R_3$ may be a cyanoethyl group; A denotes a phenylene group which may have a methyl group; and X denotes an anion.

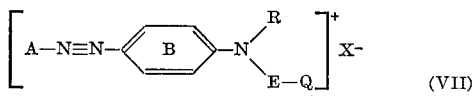

wherein A denotes a phenyl group, a thiazolyl group, a thiadiazolyl group, or a benzothiazolyl group each of which may have a substituent; B denotes a phenylene group which may have a methyl group or a methoxy group; R denotes a hydrogen atom, a methyl group, or an ethyl group; E denotes an ethylene group, a 1,2-propylene group, a 1,3-propylene group, or a polyoxyethylene group each of which may have a hydroxy group or an alkoxy group; Q denotes a quaternary ammonium group; and X denotes an anion.

Examples of said dyes include the dyes as referred to in French Pat. No. 1,455,234.

Phosphoric acids which are used as a component in preparing a cationic dye solution according to the invention include a phosphoric acid in the form, for example, of about a 75% aqueous solution.

Acidic phosphoric acid esters which are used as another component in preparing a cationic dye solution according to this invention include acidic phosphoric acid esters which are produced from a polyhydric alcohol and a phosphoric acid, especially from a dihydric alcohol or trihydric alcohol such as polyethylene glycol or glycerine and a phosphoric acid.

The cationic dye solution in accordance with this invention may be obtained without the phosphoric acid or acidic phosphoric acid esters mentioned above if the cationic dyes are used in the form of a phosphoric acid salt or an acidic phosphoric acid ester salt.

Examples of the water-soluble organic solvents which are used as component of the cationic dye solution in accordance with the invention include organic solvents having a boiling point higher than 80° C., preferably higher than 100° C., such as glycerine; ethylene glycol; diethylene glycol; triethylene glycol; dipropylene glycol; diglycerine; methyl ether, ethyl ether, propyl ether, or butyl ether of said polyols; thiodiethylene glycol; bisoxyethyl sulphone; bisoxyethyl formamide; dimethyl sulphoxide; dimethyl formamide; and preferably, ethylene glycol, diethylene glycol, or dipropylene glycol and lower alkyl ether thereof.

The above-mentioned organic solvents are used directly, or as a mixture with water.

The cationic dye solution in accordance with this invention may contain, in addition to the above-mentioned components, a weak organic acid, a weak inorganic acid, a weak base, antifoaming agent, an antifungal agent, a wetting agent, a dyeing assistant, a hydrotropic agent, a surfactant, and a known assistant to comply with the the destination.

Further, the cationic dye solution according to this invention may contain a dye such as anionic acid dye, direct dye, metallized dye, fluorescent brightening dye, disperse dye, vat dye, and/or pigment in order to fulfil specific requirements and purposes.

The cationic dye solution according to the invention is prepared by mixing the above-mentioned components in optional order, stirring the mixture, heating if necessary, so as to dissolve one another uniformly. The resulting solution is filtered, if required, to remove insoluble residue, and the concentration of the solution is adjusted by adding dye, water, or organic solvent, as the case may be. Also, it is possible to prepare an aimed cationic dye by mixing several kinds of said dye solutions.

It is of prime importance from a practical viewpoint that the cationic dye solution of this invention is such a concentrated and stable dye solution that it may be miscible with water in any desired proportion to afford a solution having a strength corresponding to 25% to 100% of that of the conventional powdered dye.

The cationic dye solution according to this invention constitutes a concentrated solution containing 5 to 40% pure dyestuff.

Cationic dye solutions comprised chiefly of the organic carboxylic acid salt of a basic dye and a water-soluble organic solvent are known in the prior art. The present invention provides a more concentrated cationic dyestuff solution having greater stability on storage as compared with said known solutions. Further, the cationic dyestuff solution of this invention does not have an odor as offensive as present in conventional cationic dye solutions. Still further, as compared with known, similar cationic dye solutions containing sulphuric acid, chlorosulphonic acid, or sulphuric acid ester as components, the cationic dye solution of this invention is far superior in dye concentration and storage stability, less corrosive to apparatus and less harmful to the human body.

The invention will now be described by reference to some preferred examples for the purpose of illustrating the invention and not for the purpose of limiting the same.

EXAMPLE 1

33 parts of dye of the following formula:

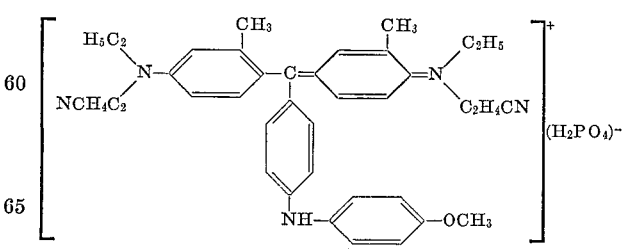

were dissolved in 127 parts of a solution consisting of 94 parts of dimethyl formamide and 33 parts of water at 60° C. under stirring in about 30 minutes, and the insoluble matter was filtered off with the aid of a 200 mesh screen. Thus, about 160 parts of a concentrated solution of the above-mentioned dye were obtained.

110 parts of this concentrated dye solution had almost equal dyeing strength to 100 parts of the commercial dye powder manufactured and sold by Badische Aniline & Soda Fabrik under the trade name "Basacryl Blue GL" (C.I. Basic Blue 54), and readily dissolved in water at a room temperature in all proportions to give dyeings in brilliant blue shades of good fastness on polyacrylic textile material.

EXAMPLE 3

The same method as in Example 2 was followed to obtain concentrated solutions of the dyes indicated in the following items (a) to (d). These dyes gave dyeings on polyacrylic textile material in the shades as follows:

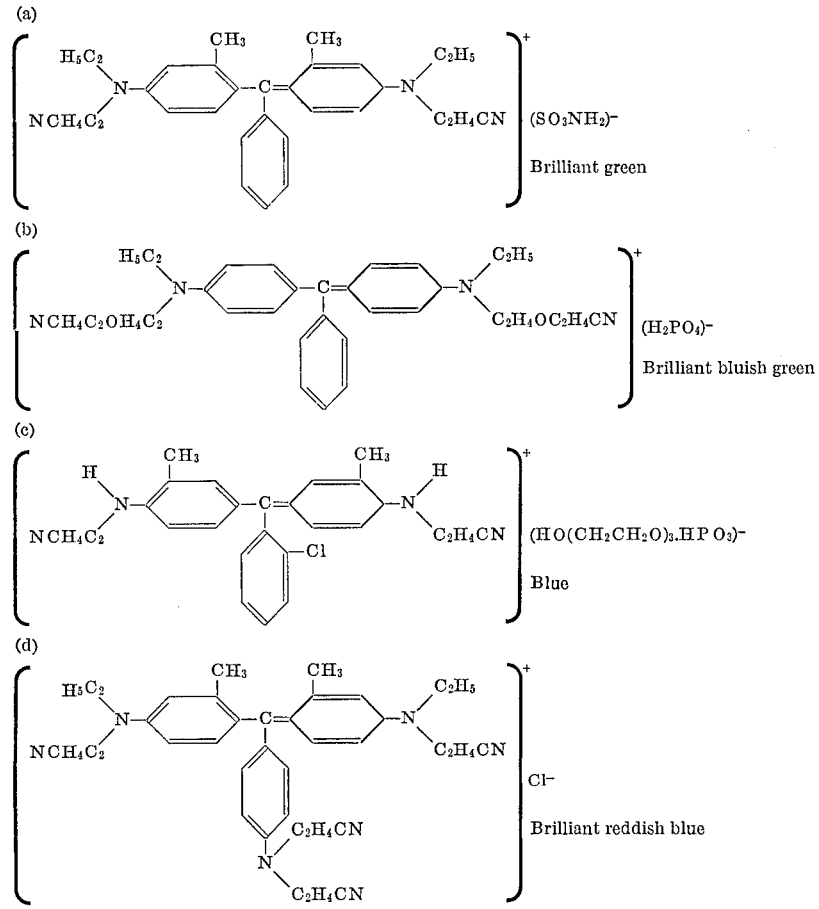

EXAMPLE 2

33 parts of the same dye as in Example 1 were added to 117 parts of a solution consisting of 103 parts of dimethyl formamide and 14 parts of phosphoric acid to obtain 150 parts of a concentrated dye solution by following the same process as in Example 1.

100 parts of this concentrated solution had a dye concentration approximately equivalent to that of 100 parts of a commercial dye powder having the trade name "Basacryl Blue GL" and readily dissolved in water at a room temperature in all proportions.

33 parts of the same dye as mentioned above were added to a solution comprising 76% phosphoric acid, water and organic solvent in the amounts as indicated in the following columns A, B and C to obtain a concentrated dye solution by the same process as in Example 1. The dyeing strength of 100 parts of a concentrated solution of each of the dyes thus obtained is compared with that of 100 parts of "Basacryl Blue GL" in the following column D.

| Number | A In part | B In part | C In part | D In percent |
|---|---|---|---|---|
| 1 | 14 | 0 | Diethanolamine formate (120) | 90 |
| 2 | 7 | 0 | Carbitol (140) | 95 |
| 3 | 7 | 47 | Diethylene glycol (184) | 65 |
| 4 | 7 | 0 | Ethylene glycol (167) | 84 |
| 5 | 11 | 37 | Thiodiethylene glycol (220) | 58 |
| 6 | 22 | 62 | Diglycerin (120) | 73 |
| 7 | 11 | 37 | Bisoxyethyl sulfone (213) | 59 |

EXAMPLE 4

40 parts of a purified dye which had been obtained by recrystallizing from hot water the dye manufactured and sold by Bayer Co. under the trade name "Astrazone Orange G" (C.I. No. 48035) were dissolved in 195 parts of a solution comprising 125 parts of dimethyl formamide, 40 parts of 76% phosphoric acid, and 30 parts of water at 50° C. After stirring for about one hour 235 parts of a concentrated solution of the aforesaid dye were obtained.

The concentrated solution thus obtained had about 67% strength as compared with the commercial dye powder of said dye. Similarly, the dye of the following formula gave concentrated solutions which dyed polyacrylic textile material to brilliant yellow shades of good fastness.

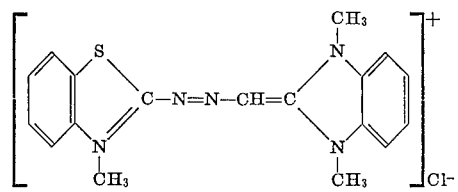

EXAMPLE 5

48 parts of a dye having the following formula:

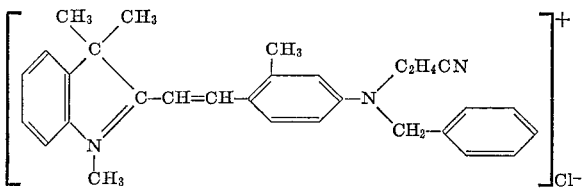

were dissolved in 252 parts of a solution comprising 232 parts of carbitol and 76% phosphoric acid at 50° C. After stirring for about 30 minutes 300 parts of concentrated solution of the above-mentioned dye were obtained.

The concentrated solution thus obtained had about 50% dyeing strength as compared with the commercial dye powder manufactured and sold by E. I. du Pont de Nemours & Company, Inc. under the trade name "Sevron Brilliant Red 4G" (C.I. Basic Red 14). It also gave similar shades, and dissolved in water at room temperature in all proportions.

EXAMPLE 6

86 parts of a dye of the following formula:

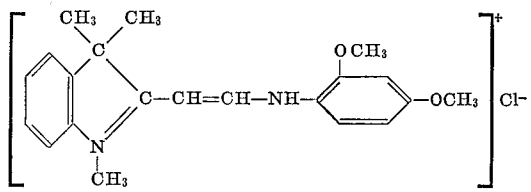

were dissolved in a solution comprising 381 parts of dimethyl formamide and 33 parts of 76% phosphoric acid at 50° C. After stirring for about 30 minutes 500 parts of concentrated solution of the above-mentioned dye were obtained. The concentrated solution thus obtained had about 48% dyeing strength as compared with the commercial dye powder manufactured and sold by Bayer Company under the trade name "Astrazone Brilliant Yellow 3G" (C.I. No. 4800). It also gave similar shades and readily dissolved in water at room temperatures in all proportions.

EXAMPLE 7

20 parts of a dye of the following formula:

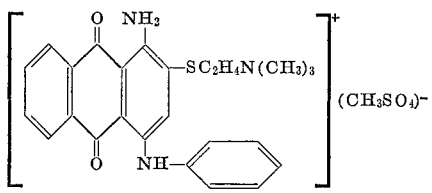

were dissolved with the aid of heat and stirring in a solution comprising 155 parts of dimethyl formamide and 7 parts of 76% phosphoric acid. About 180 parts of a concentrated solution of the above-mentioned dye were obtained. The concentrated solution thus obtained had about 35% dyeing strength as compared with the commercial dye powder manufactured and sold by Bayer Company under the trade name "Astrazone Blue FGL" (C.I.: Basic Blue 44). It also readily dissolved in water at room temperature in all proportions.

EXAMPLE 8

20 parts of a dye of the following formula:

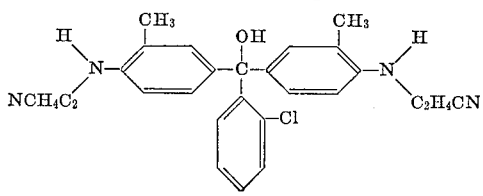

were dissolved in a solution comprising 7 parts of glycerine phosphate, 83 parts of water, 0.5 part of sulfamic acid and 22 parts of ethylcarbitol at about 60° C. with the aid of heat and stirring. About 132 parts of a concentrated solution of the said dye were obtained. The concentrated solution thus obtained had about 66% of dyeing strength as compared with the commercial dye powder manufactured and sold by Bayer Company under the trade name "Astrazone Blue BG" (C.I.: No. 51005). It also readily dissolved in water at room temperature in all proportions. A similar concentrated dye solution was obtained by employing acid phosphate of triethylene glycol in place of glycerin phosphate.

EXAMPLE 9

The following dyes (a) to (d) were dissolved with the aid of heat and stirring, in a solution comprising 4.8 parts of a concentrated solution of the dye obtained in Example 4, 36 parts of dimethyl formamide, and 0.7 part of 76% phosphoric acid.

(a)

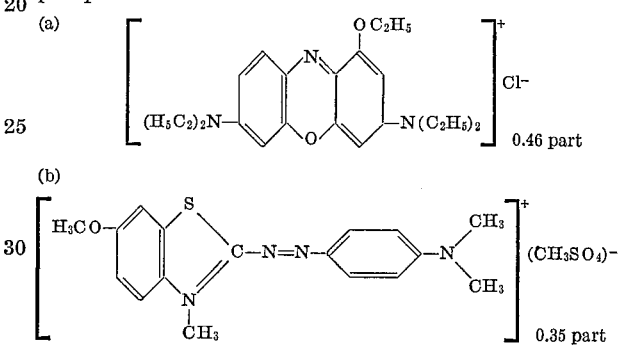

0.46 part (b)

0.35 part (c)

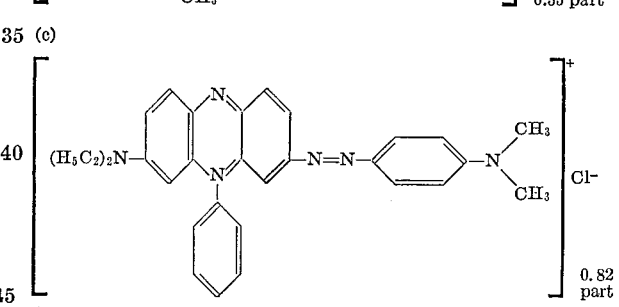

0.82 part (d)

0.23 part

The concentrated solutions of dyes thus obtained readily dissolved in water in all proportions and gave dyeings on polyacrylic textile material in heavy navy blue shades.

EXAMPLE 10

The dyestuffs as indicated in the following items (a) to (f) were dissolved with the aid of heat and stirring in a solution comprising 975 parts of carbitol, 112 parts of 76% phosphoric acid, 100 parts of sulfamic acid, 20 parts of nonionic surfactant manufactured and sold by Kaō-Atlas Co. under the trade name "Emulgen #920," and 93 parts of water.

(a)

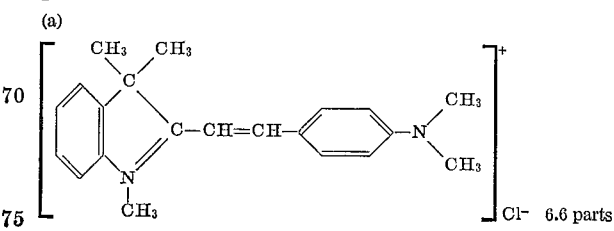

6.6 parts (b)

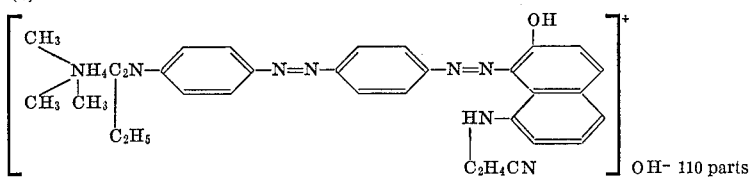

(c)

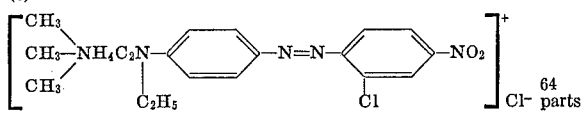
Cl⁻ 64 parts (d) 32 parts of the dye used in Example 4
(e) 25 parts of the dye "Methyl Violet" (C.I. No. 42535)
(f) 46.8 parts of the dye "Diamond Green" (C.I. No. 42040)

The concentrated solutions of the dyes thus obtained readily dissolved in water in all proportions and gave dyeings on polyacrylic textile material in beautiful reddish black shades, and had about 67% of dyeing strength as compared with commercial dye powder which gave similar shades.

EXAMPLE 11

The solid dyes having the formula as indicated under items (a) to (g) were pulverized for admixing.
(a) Methyl Violet (C.I. No. 42535)
(b) Malachite Green (C.I. No. 42000)

(c)

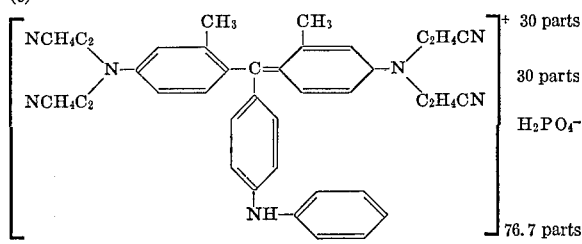
30 parts
30 parts
$H_2PO_4^-$
76.7 parts (d)

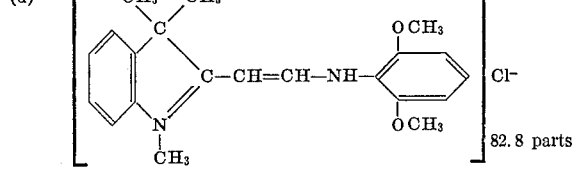
Cl⁻ 82.8 parts (e) The dyestuff used in Example 4. 37.4 parts (f)

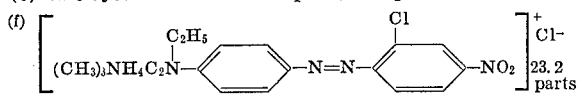
Cl⁻ 23.2 parts (g)

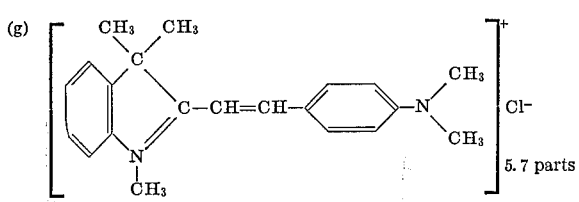
Cl⁻ 5.7 parts 14 parts of the resulting dye mixture were added to 5 parts of 76% phosphoric acid then 76 parts of diethylene glycol, 3 parts of a substance manufactured and sold under the trade name "Emulgen #920" by Kaō-Atlas Company, and 11 parts of water were successively added. The dye mixture was completely dissolved after stirring for about 1 hour at 60° C. The resulting dye solution readily dissolved in water in all proportions and dyed acrylonitrile textile material to reddish black shades. The concentrated solution thus obtained had about 45% of dyeing strength as compared with a commercial powdered black dye. 14 parts of the dye mixture mentioned above were added to a solution comprising 76% phosphoric acid, water, "Emulgen #920" sold by Kaō-Atlas Company and organic solvent in the amounts as indicated in the following columns A, B, C and D to obtain a concentrated dye solution by the same process as mentioned above. The dyeing strength of 100 parts of the concentrated dye solution thus obtained is compared with that of 100 parts of commercial powdered black dye manufactured and sold by Sumitomo Chemical Industry under the trade name "Sumiacryl Black CP" in the following column E.

| Number | A in part | B in part | C in part | D in part | E in percent |
|---|---|---|---|---|---|
| 1 | 5 | 16 | 3 | Carbitol (100) | 39 |
| 2 | 5 | 6 | 3 | Thiodiethylene glycol (50) | 64 |
| 3 | 5 | 16 | 3 | Ethylcellosolve (200) | 22 |
| 4 | 5 | 6 | 3 | A solution mixture comprising 80 parts of ethoxy triglycol and 20 parts of ethylene glycol (100). | 39 |

EXAMPLE 12

100 parts of a dye having the following formula:

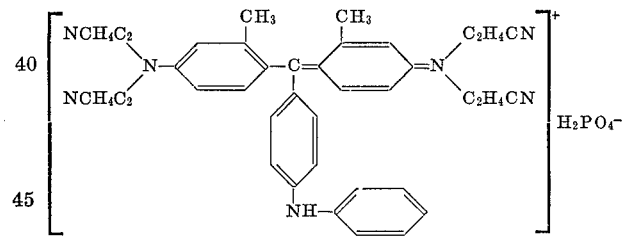

were dissolved at 60° C. in 1 hour with the aid of stirring in a solution comprising 110 parts of diethylene glycol monobutyl ether, 2 parts of 76% phosphoric acid, 12 parts of the addition product resulting from the addition reaction of ethylene oxide with dodecylamine, said addition product having the formula $C_{12}H_{25}N(C_2H_4O)_{14}\cdot H$, and 200 parts of water. Insoluble matter was filtered off with the aid of a 200 mesh screen. About 420 parts of a concentrated solution of the above mentioned dye were obtained. The concentrated dye solution thus obtained had almost equal dyeing strength to that of commercial dye powder known under the trade name "Basacryl Blue GL," readily dissolved in water at room temperatures in all proportions, and gave dyeings on polyacrylic textile material in excellent blue shades of good fastness.

EXAMPLE 13

60 parts of diethylene glycol monobutyl ether, 2 parts of 76% phosphoric acid, 0.5 part of a condensate, obtained by the addition reaction of an ethylene oxide of from 10 to 15 mol to dodecylamine, and 1 part of benzyl trimethylammonium phosphate were added to sufficient water to make up 100 parts of solution.

The dyes as indicated under the following items (a) to (e) were dissolved in the said solution to obtain concentrated solutions, which dyed acrylic fibrous materials to intense black shades.

| Number | Formula | Addition, in parts |
|---|---|---|
| a | 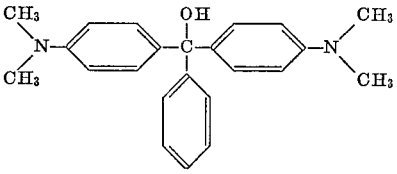 | 10 |
| b | 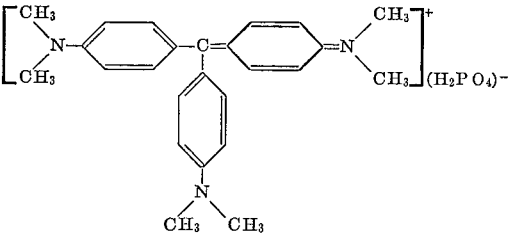 | 10 |
| c | 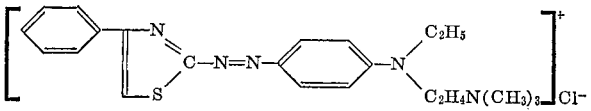 | 6 |
| d | 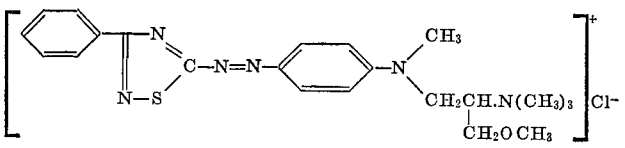 | 5 |
| e | 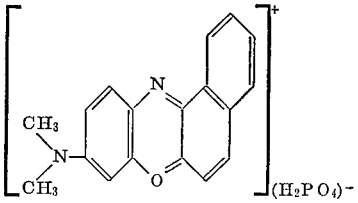 | 5 |

We claim:

1. A concentrated cationic dye solution consisting essentially of
   (1) at least one cationic dye, said dye being a triarylmethane-, methine-, polymethine-, polyazamethine-, azine-, oxazine-, thiazine-, azo-, anthraquinone-, triazine dye or a salt of said dyes, said dyes having at least one quaternary ammonium group in their molecule,
   (2) phosphoric acid or an acidic phosphoric acid ester, said acidic phosphoric acid ester being a reaction product of phosphoric acid and polyethylene glycol or glycerin, and
   (3) at least one water-soluble organic solvent, said solvent being glycerin, ethylene glycol, diethylene glycol, triethylene glycol, dipropylene glycol, diglycerin, or a methyl-, ethyl-, propyl-, or butyl ethers thereof, thiodiethylene glycol, bisoxyethylsulfone, or bisoxyethyl formamide, polyols of the formula HO·R(G·R')n·OH wherein R and R' denote an alkylene group having 2 to 3 carbon atoms or a 2-oxy-propyl group, $n$ denotes an integer which is zero to 2, and G denotes an oxygen atom, when $n$ is 1, G may also be a sulphur atom, a sulphonyl group or a >N·COH group; a lower alkyl ether of said polyol; dimethyl sulphoxide; or dimethyl formamide.

2. A concentrated cationic dye solution consisting essentially of
   (1) at least one cationic dye, said cationic dye having at least one quaternary ammonium group in its molecue, said dye being selected from among dyes of the following Formulae I to VII:

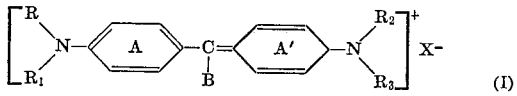

wherein R, $R_1$, $R_2$ and $R_3$ denote a hydrogen atom or an alkyl group having 1 to 3 carbon atoms which may be cyano, alkoxy, halogen or hydroxy substituted; A and A' denote a phenylene group which may be methyl or methoxy substituted; B denotes an aryl group; and X denotes an anion;

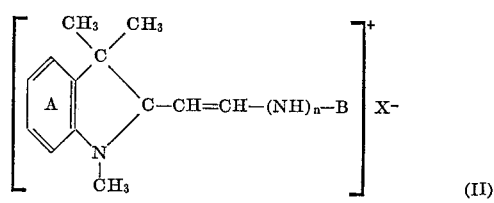

wherein A denotes a phenylene group which may be methyl or methoxy substituted; B denotes an aryl group; $n$ denotes an integer which is zero to 1; and X denotes an anion;

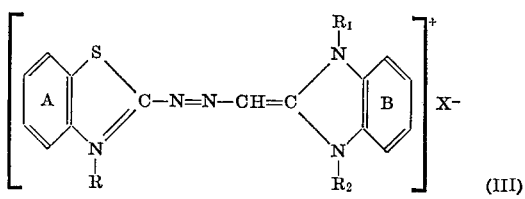

wherein R, $R_1$ and $R_2$ denote an alkyl or an aralkyl group, A and B denote a phenylene group which may be substituted; and X denotes an anion;

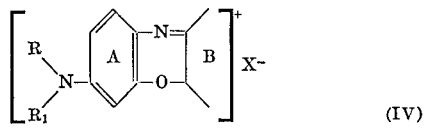

(IV)

wherein A denotes a phenylene group which may be substituted; B denotes an aromatic residue; R and $R_1$ denote a hydrogen atom, a methyl group, or an ethyl group; and X denotes an anion;

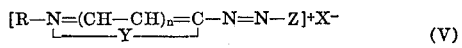

(V)

wherein R denotes a methyl, ethyl or cyanoethyl group; Y denotes a group which supplements a nitrogen-containing ring to a hetero aromatic nucleus having 5 to 6 members; $n$ denotes an integer which is zero to 1; Z denotes an aromatic residue; and X denotes an anion;

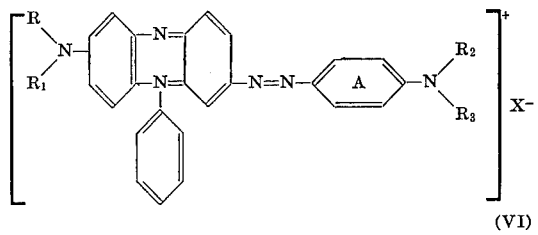

(VI)

wherein R, $R_1$, $R_2$ and $R_3$ denote a hydrogen atom, a methyl group or an ethyl group, whereas $R_2$ and $R_3$ may be a cyanoethyl group; A denotes a phenylene group which may have a methyl group substituted; and X denotes an anion; and

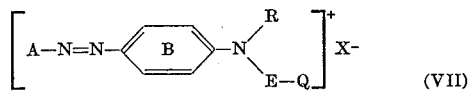

(VII)

wherein A denotes a phenyl, a thiazolyl, a thiadiazolyl, or a benzothiazolyl group which may be substituted; B denotes a phenylene group which may be methyl or methoxy substituted; R denotes a hydrogen atom, a methyl group, or an ethyl group; E denotes an ethylene, a 1,2-propylene, a 1,3-propylene or a polyoxyethylene group which may be hydrogen or alkoxy substituted; Q denotes a quaternary ammonium group; and X denotes an anion;

(2) phosphoric acid or an acidic phosphoric acid ester, said acidic phosphoric acid ester being a reaction product of phosphoric acid and polyethylene glycol or glycerin, and (3) at least one water-soluble organic solvent, said solvent being glycerin, ethylene glycol, diethylene glycol, triethylene glycol, dipropylene glycol, diglycerin, or a methyl-, ethyl-, propyl-, or butyl ether thereof, thiodiethylene glycol, bisoxyethyl sulfone, or bisoxyethyl formamide.

3. The concentrated cationic dye solution of claim 1, wherein said acidic phosphoric acid ester is a reaction product of phosphoric acid and triethylene glycol.

4. The concentrated cationic dye solution of claim 2, wherein said acidic phosphoric acid ester is a reaction product of phosphoric acid and triethylene glycol.

5. The concentrated cationic dye solution of claim 1, wherein said acidic phosphoric acid ester is glycerin phosphate or triethylene glycol phosphate.

6. The concentrated cationic dye solution of claim 2, wherein said acidic phosphoric acid ester is glycerin phosphate or triethylene glycol phosphate.

7. A method for dyeing a polyacrylonitrile textile material with a concentrated cationic dye solution as described in claim 1 which method comprises the step of treating said material with said dye solution.

8. A method for the manufacture of concentrated cationic dye solutions of claim 1, which comprises admixing the following components:

(1) said cationic dye;
(2) said phosphoric acid or acid phosphoric acid ester; and
(3) said water-soluble organic solvent.

References Cited

UNITED STATES PATENTS

| | | | |
|---|---|---|---|
| 2,741,605 | 4/1956 | Zwilgmeyer | 8—55ABX |
| 3,070,418 | 12/1962 | Bann et al. | 8—79 |
| 3,314,994 | 4/1967 | Schubert et al. | 8—85X |
| 3,346,322 | 10/1967 | Finkenauer et al. | 8—79 |
| 3,416,877 | 12/1968 | Gantz et al. | 8—55AB |

GEORGE F. LESMES, Primary Examiner

T. J. HERBERT, Jr., Assistant Examiner

U.S. Cl. X.R.

8—41, 171, 173, 177